United States Patent [19]
Kuris

[11] 4,071,385
[45] Jan. 31, 1978

[54] ULTRASONIC INLAID ARTICLE

[76] Inventor: Arthur Kuris, 3725 Henry Hudson Pkwy., Riverdale, N.Y. 10463

[21] Appl. No.: 687,996

[22] Filed: May 19, 1976

[51] Int. Cl.[2] ........................ B29C 27/08; B32B 31/16

[52] U.S. Cl. ................................ 156/73.1; 51/59 SS; 51/317; 156/73.3; 156/154; 156/272; 156/281; 156/285; 156/293; 156/295; 156/297; 156/298; 156/303.1; 156/513; 156/514; 156/529; 156/580; 428/67

[58] Field of Search .................... 156/73.1, 303.1, 580, 156/580.1, 580.2, 154, 73.3, 153, 272, 281, 285, 293, 295, 297, 298, 513, 514, 529; 428/67; 228/172, 165, 1; 51/59 SS, 317

[56] References Cited

U.S. PATENT DOCUMENTS

| | | | |
|---|---|---|---|
| 2,143,744 | 1/1939 | Sohn | 428/67 X |
| 2,580,716 | 1/1952 | Balamuth | 51/317 X |
| 3,683,470 | 8/1972 | McMaster et al. | 156/580.2 X |

OTHER PUBLICATIONS

Neppiras, E. A. - "The Mechanism of Ultrasonic Drilling"; Metalworking Production - Aug. 24, 1956 - pp. 1333-1336.

*Primary Examiner*—Marion E. McCamish
*Attorney, Agent, or Firm*—Leonard W. Suroff

[57] ABSTRACT

The forming of an inlaid article by carving the object to be inlaid into the article with ultrasonic energy to form a recess having the same peripheral configuration as the object, and then positioning the object within the ultrasonically carved recess in the article such that upon securing the object within the recess the object forms the inlaid portion of the article.

38 Claims, 13 Drawing Figures

ULTRASONIC INLAID ARTICLE

BACKGROUND OF THE INVENTION

The present invention relates to the manufacture of an inlaid article.

An inlaid article is normally manufactured by providing a recess or cavity adapted to receive therein an inlay or object made of a different material such that a design or other artistic relationship is obtained when the inlay is associated with the article. The article may be of a variety of shapes and sizes, and the problem of the prior art procedures is the ability to manufacture the article with the inlaid object perfectly matching the various contours of the recess in the article.

Since the article itself may be made of a hard and brittle material such as stone, glass, or semi-precious jewels, the ability to carve a recess in these hard and brittle materials and have the object or item to be inset therein matching with exacting peripheral contour has been a problem to date.

This problem has existed notwithstanding the fact that ultrasonic abrasive slurry machining, also known as ultrasonic impact grinding, has been in use for a considerable number of years and has been disclosed in U.S. Pat. No. 2,580,716, issued to L. Balamuth dated Jan. 1, 1952, entitled "Method and Means for Removing Material from a Solid Body" and is described also in Ultrasonic Engineering (book) by Julian R. Frederick, John Wiley & Sons, Inc., New York, NY (1966) pages 171 to 183.

The ultrasonic abrasive slurry machining process involves the use of an ultrasonically vibrating member having a tool which is in contact with or slightly spaced from a workpiece or article. Abrasive particles suspended in a fluid are fed into the gap between the tool and the article or workpiece and are driven with a percussive impact against the workpiece. The high velocity impact of the particles on the workpiece causes an abrading action which is used for producing accurate odd-shaped holes and recesses in hard materials. The abrasive slurry material used to perform the machining may be selected from a variety of materials well-known in the art, such as boron carbide, silicon carbide, or aluminum oxide, in a manner described in Ultrasonics (book) by Benson Carlin, McGraw-Hill Book Company, Inc., New York NY (1960), pages 285 to 288.

Accordingly, although the above process has been used for carving a recess on a variety of articles, there is a certain degree of wear for each carving and therefore the cross-sectional dimensions of each recess changes or varies from carving to carving. In a similar manner, the item or object to be inserted within the recess may be hand wrought, die struck, a casting, or acid etched. These manufacturing processes are similarly not exacting in that the peripheral contour of each object will also vary in shape.

Applicant has found that the machining with ultrasonic energy of a blank object into the article with the intention of thereafter positioning the desired object therein has proven to be inadequate in that in many instances the physical spacing or shape between the peripheral wall of the object and the inner wall of the recess do not properly match each other, due to variations in the object and/or variations in the carved recess, with resultant imperfections that are visible.

OBJECTS OF THE INVENTION

An object of the present invention is to provide a new and novel inlaid article including the method and apparatus for producing same.

Another object of the present invention is the provision of a method and apparatus for forming an inlaid article in which the contour of the inlaid object and the recess in the article are in matching peripheral contour to each other.

Another object of the present invention is the utilization of the object to form the inlay as the carving tool so as to obtain a perfectly matching recess for receipt of the object therein.

Other objects and advantages of the present invention will become apparent as the disclosure proceeds.

SUMMARY OF THE INVENTION

The present invention discloses the forming of an inlaid article by providing an object capable of supporting ultrasonic vibrations that is to be inlaid into the article. The object is coupled to a member adapted to be ultrasonically vibrated and by positioning the object adjacent the article and supplying an abrasive slurry between the item and article to cause abrading machining of the article by the object, a recess is formed. The machining occurs by simultaneously vibrating the member when the object is urged into contact with the article and advancing the object and the article relative to each other as the abrasive progressively removes material from the article at the area of contact, whereby a recess having the exact peripheral contour of the object is formed in the article.

To form the inlaid article, the object is removed from within the recess and by detaching the object from the member, it is free to be positioned in the recess. By positioning the object within the recess and securing the object within the recess, the object forms the inlaid portion of the article. If any portion of the object extends above the surface of the article, it may be ground flush with the surface of the article.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

DETAILED DESCRIPTION OF THE DRAWINGS

Figure 1:
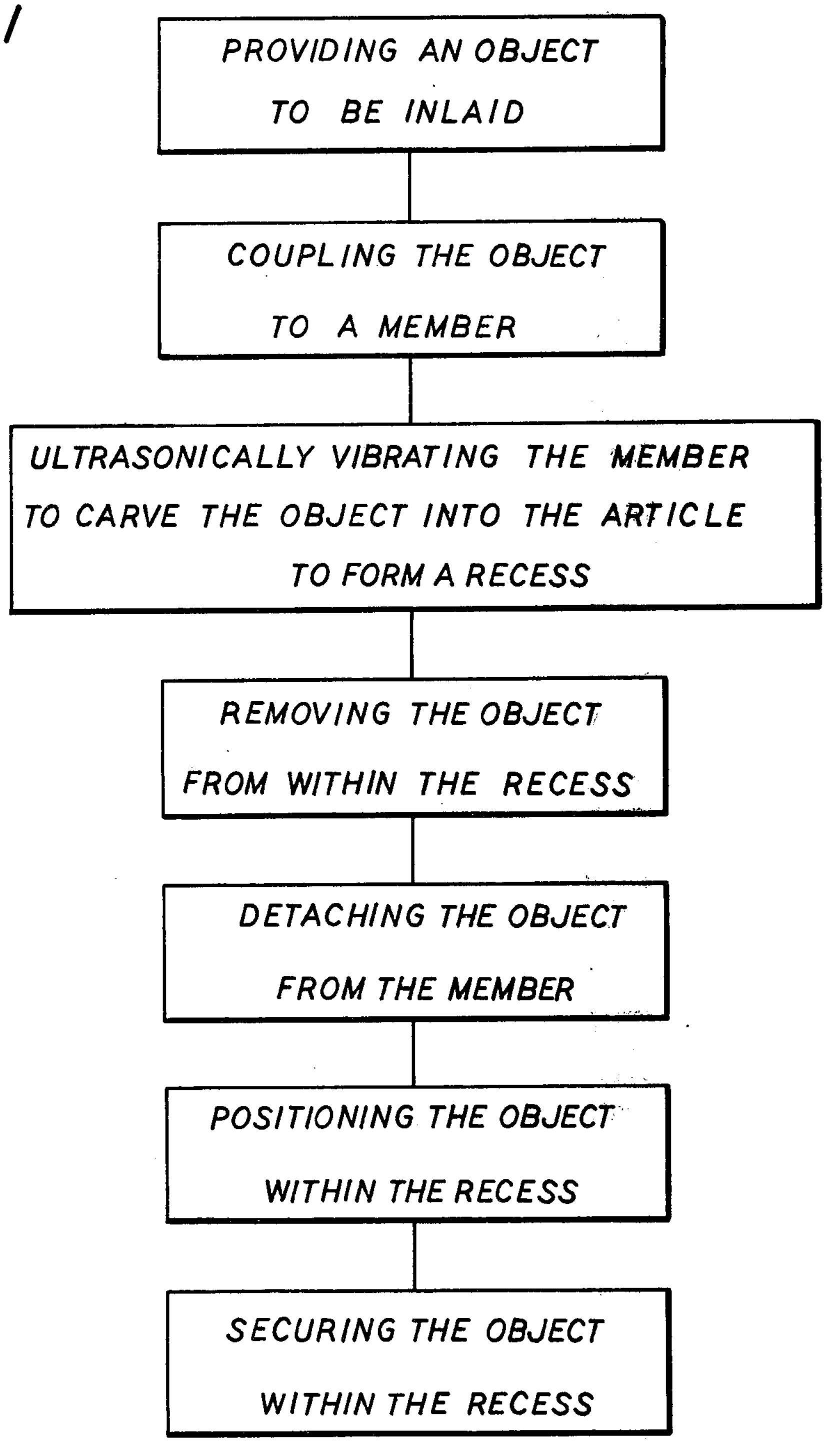
FIG. 1 is a block diagram illustrating the method of manufacturing the inlaid article of the present invention.

Referring now to the drawings and particularly FIGS. 1-7 thereof, we have illustrated an article of manufacture 10 which may take various forms, shapes, and sizes from an item to be worn such as jewelry, a paperweight, or block, a plate, ashtray, etc. The article 10 has a body 12 that may be made out of a variety of hard and brittle materials such as stone, glass, or semi-precious jewels.

An inlay or object 14 is positioned within a recess 15 within the body 12. Various manufacturing processes may be utilized to produce the object 14, such as hand wrought, die struck, casting or acid etched. The object 14 is made out of a metallic material, or any other material capable of sustaining and transmitting ultrasonic vibrations. The object 14 may be made out of a precious metal such as silver or gold.

With particular reference to FIG. 1, the essential steps of forming the article 10 are set forth and include a series of interrelated steps. Essentially the object 14 to be inlaid is provided and capable of sustaining and transmitting ultrasonic vibrations since it is to be used as both the tool and inlay. By coupling the object 14 to a member that will in turn be ultrasonically vibrated, the object performs the dual function as that of being both the object forming part of the article 10 as well as the tool itself to be used for carving. The object 14 is coupled to a member by the use of soft solder or by brazing it thereto such that it may be removed from its coupled relationship to the member without any damaging effects.

By positioning the object 14 adjacent the article 10 and ultrasonically vibrating the member to which the object 14 is attached, it is possible to carve the object 14 into the article to form the recess 15. The carving is accomplished by supplying an abrasive slurry between the object 14 and the body 12 of the article 10 to cause abrading machining of the body 12 by the object 14. Simultaneously with supplying the abrasive the member is vibrated and the object 14 is urged into the article 10. By continuously advancing the object 14 and body 12 relative to each other as the abrasive progressively removes material from the body 12 at the area of contact, the recess 15 is formed having the exact peripheral contour of the object 14 in the article 10.

By removing the object from within the recess 15, the recess 15 may be cleansed of any abrasive material contained therein in anticipation of mounting the object 14 in the recess 15. By detaching the object from the member, the object is then free to act as the inlay to be utilized to form the article 10. The object 14 is then positioned within the recess 15, and by securing the object 14 within the recess, as by using an epoxy or other cement, the object 14 forms the inlaid portion of the article 10. Once the cement has hardened, it is then possible to remove any portion of the object 14 extending above the upper surface of the article 10 until both surfaces are flush with each other.

Figure 2:
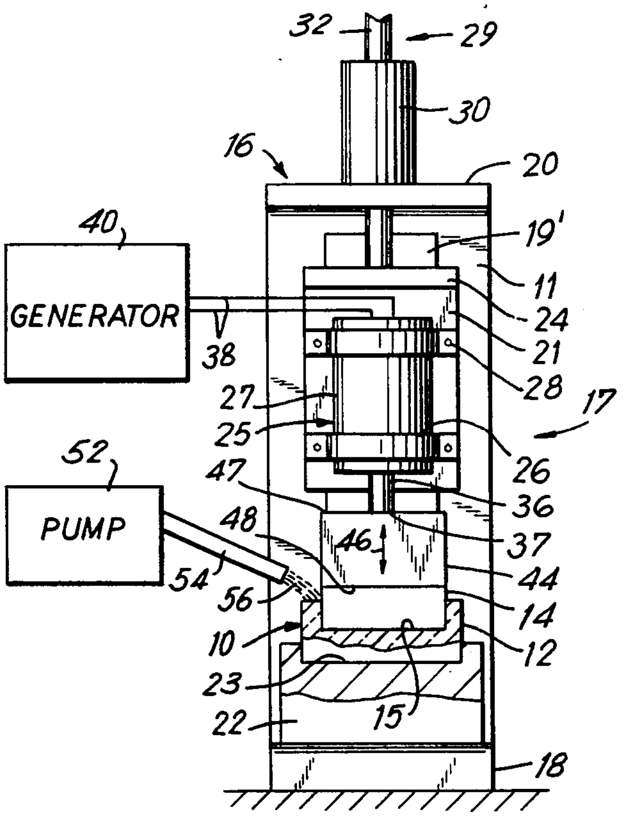
FIG. 2 is a front view of an ultrasonic carving system utilized in accordance with the present invention.
Figure 3:
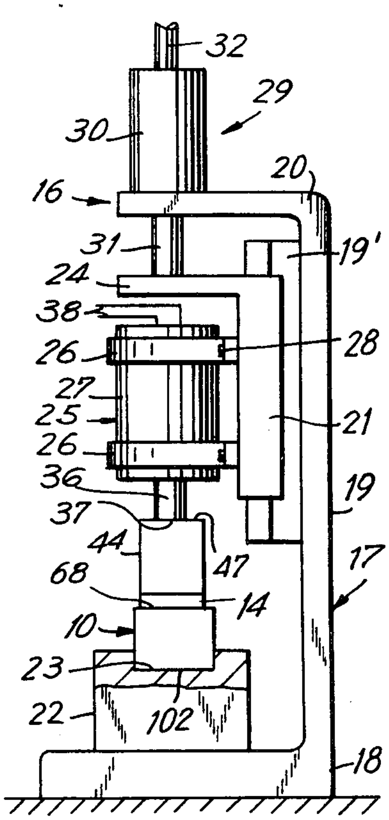
FIG. 3 is a side view of the ultrasonic carving system of FIG. 1.

Referring to FIGS. 2 and 3, there is illustrated apparatus 16 for ultrasonically carving the body 12 of the article 10. As indicated by the crosshatching in FIG. 2, the article 10 is of a hard material such as glass, but it will be realized that rigid bodies or sheets of materials such as crystal, metal, gems, stones, etc., may be machined and inlaid in accordance with the present invention.

The basic structure for carving materials as well understood by those skilled in the art, comprises a vibrator support assembly in the form of a support stand 17 that is provided for maintaining the vibrator assembly 25 in proper position, and may include a base 18 with an upright wall 19 extending upwardly from one end of said base and a head 20 extending from the upright wall 19 and in overlapping relationship to the base 18. Mounted on the upright wall 19 is a mounting channel 19' which engages a support block 21 which is slidably connected by a dovetail connection (not shown) to the mounting member 19' to permit vertical movement of the vibrator assembly 25 between the base 18 and head 20 of the support stand 17. The vibrator assembly 25 is suitably secured to the support block 21, for example, by means of bands 26 which encompass the casing 27 of the vibrator assembly and are secured to the support block 21 by means of bolts 28. A support member or mounting fixture 22 of any suitable type for holding the body 12 is provided on the base 18 and has a seat or depression 23 therein for receiving the body 12.

Drive means 29 to effect vertical movement of the vibrator assembly 25 toward and away from the support member 22 is provided and may be in the form of an air cylinder 30 vertically mounted to the head 20 and having a shaft 31 extending therefrom and through the head 20 and coupled to a horizontal flange 24 of the support block 21 in any conventional manner. The air cylinder 30 may be operated by supplying compressed air conveyed by a conduit 32 from an exterior source (not shown) and extended from the rear of the cylinder. The exact height of adjustment is generally determined prior to the commencement of the carving cycle and will determine the depth of the recess 15. The drive means 29 acts also as the means for removing the object 14 from within the recess 15 at the end of the carving cycle.

The mechanical vibrator assembly 25 includes a transducer (not shown) which may be any one of a number of electromechanical types, such as, electrodynamic, piezoelectric, or magnetostrictive. The operating frequency may be in the sonic or ultrasonic range between approximately 1 KHz to 100 KHz, but preferably in the range from 10 KHz to 30 KHz. The vibrator assembly 25 is of the type generally disclosed in the art. The transducer housed within the casing 27 may be cooled as by water or air.

The vibrator assembly 25 generally includes a driver unit made up of a transducer secured to an acoustic impedance transformer or connecting member 36 that extends from the casing 27. The transducer of mechanical vibrations may comprise a stack of laminations of magnetostrictive material, for example, nickel, and surrounded by a coil winding (not shown) adapted to carry a biased, high-frequency alternating energizing current.

The lower ends of the laminations making up the stack of the transducer are fixedly secured, as by welding or soldering, to the upper end of the transducer 36. The transformer 36 has an enlarged section (not shown) in the general area of a nodal plane of motion, and this section constitutes a flange secured to the casing 27.

A biased, high-frequency alternating current is supplied to the winding through conductors 38 extending from a suitable oscillation generator 40, well known in the art. An oscillation generator is effective to supply a biased alternating current to the winding at a resonant frequency of the driver unit of transducer and is further effective to vary the frequency of the supplied biased, alternating current when the resonant frequency of the driver unit is varied due to changes in temperature, or changes in the loading thereof. The frequency of the supplied biased alternating current is adjusted in the oscillation generator in response to a feedback signal from a capacitor-type pickup connected in the transducer; it is to be understood that other types of pickups may be employed. Oscillation generators may be employed, in which adjustment of the frequency of the alternating current supplied by the oscillation generator is obtained through the use of a feedback signal which varies with the impedance of the transducer.

The lower output end 37 of transformer 36 is coupled to the input end 47 of transmission member 44 with the replaceable object 14 so that when the vibrator assembly 25 is operated, by electrical oscillations supplied from generator 40, compressional waves are generated in the vibrator 25, the transformer 36, transmission member 44, and object 14, so as to cause vibrational movements in the vertical direction, that is along the longitudinal axis of the transducer.

For the purposes of the present invention, such vibrations preferably have a frequency in the range between approximately 1,000 cycles per second and 100,000 cycles per second, and are of sizable amplitude, for example, in the range between approximately 0.0001 and 0.01 inch. In order to ensure that the maximum amplitude of vibration in the vertical direction is obtained at the lower end 48 of the transmission member 44, as indicated by the double headed arrow 46, thus ensuring the maximum transmission of working acoustical energy, the overall length of the motor, the transformer 36, member 44, and the object 14 is selected so that, at the frequency of the electrical oscillations a loop of longitudinal motion of the generated compressional waves occurs at or near the object front surface.

The member 44 is of a metallic material having good acoustical transmission properties so that the vibrations transmitted from the input surface 47 are propagated through the member to its output surface 48. The coupling between the output end 37 of the vibrator assembly 25 and the member 44 may be of any conventional form, for example as by a threaded coupling (not shown). The output surface 48 of the member 44 may have any number of desired configurations but is usually flat. The pump means 52 through a tubing 54 directs an abrasive slurry 56 toward the interface between the object 14 and body 12.

It will be apparent that the front end 48 of the member 44 is firmly secured as by brazing or soldering to the replaceable object 14 which may be cast, etched, stamped, or manufactured in a conventional way known in the art. In addition the carving system will include means for collecting the spent abrasive slurry and recirculating same in a manner well known in the art.

Figure 4:
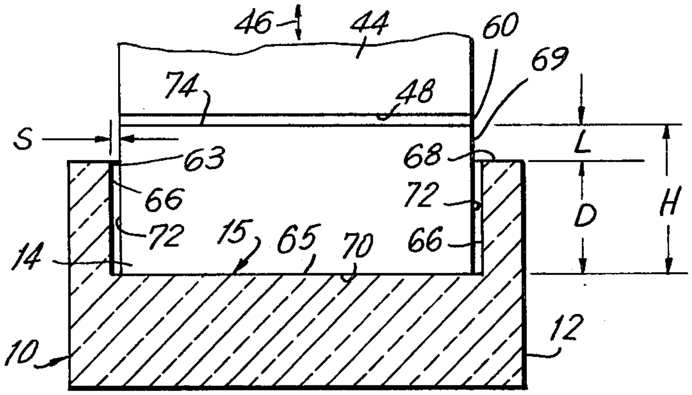
FIG. 4 is an enlarged fragmentary view in cross-section of the object being utilized as the tool during the carving operation.
Figure 5:
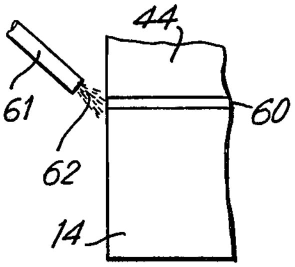
FIG. 5 is a fragmentary view for removing the object from the vibrating member.
Figure 7:
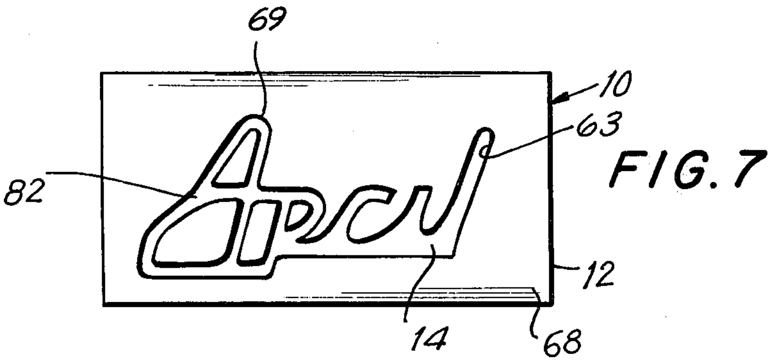
FIG. 7 is a top view of the article illustrating the inlaid article.

As seen in FIG. 4, the output end 48 of the member 44 has secured thereto the object 14 as by a thin layer of brazing or soldering material 60 from which the object can easily be removed as illustrated in FIG. 5 by providing heating means 61 that generates a flame 62, or by positioning in an oven, etc. The actual configuration of the body portion 12 may take on various shapes and sizes. As illustrated in FIG. 7, the body portion 12 has a contoured configuration with the word "APRIL" set forth in a script fashion.

The machined recess or cavity 15 is formed with a contoured configuration 63 that includes a bottom wall or surface 65 and an upright wall or surface 66. The upright wall or surface 66 may extend in a plane substantially normal or at right angle to the upper surface or top 68 of the body 12 of the article 10. The object 14 includes a peripheral border 69 which forms the contoured configuration 63 of the recess 15 during carving. The object 14 has a bottom end 70 which is the vibrating surface for forming the bottom surface 65 of the recess 15 and has an upright end wall or surface 72 that is formed in matching configuration to the side wall 66. The upper end 74 of the object 14 is detachably secured to the output end 48 of the member 44 by the solder or brazing 60.

In view of the fact that the abrasive slurry 56 has a certain thickness to it, there is defined a spacing S between the outside border 69 of the object 14 and the contoured wall configuration 63 of the recess 15. The spacing S between the border 69 of the object 14 and the contour 63 of the recess 15 may be in the range of 0.0001 inch to 0.005 inch, and generally in the range of 0.0005 inch to 0.002 inch. This spacing S is related to the grit size of the abrasive compound used within the abrasive slurry. The abrasive slurry in effect laps the border 69 and contoured configuration 63 to obtain the desired matching configuration. Both the peripheral border 69 and the wall configuration 63 may be vertically extending or inclined.

By having the object 14 used as a tool in the carving process, the applicant has found that a perfectly matching contour occurs in each instance since the object 14 becomes matched to a particular body 12 to in effect form a set such that the border 69 conforms to the contour 63.

Figure 6:
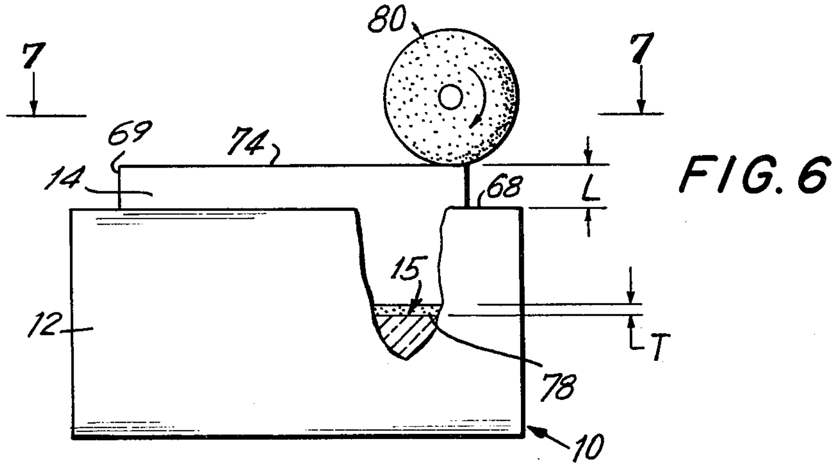
FIG. 6 is a front view of the article, partly in section, showing the removal of a portion of the object.

With particular reference to FIG. 6, after the object 14 has been removed from its securement to the member 44, it is set within the recess 15 and retained in place by the bonding agent 78 that may have a thickness T of a few thousandths of an inch. A variety of bonding agents are available to form a permanent bond between the object 14 and body 12.

In most instances the height of the body 12, as illustrated in FIG. 4 by the dimension H, is greater than the depth of the recess 15 illustrated by the dimension D, the difference between the two being illustrated by the dimension L. It has been found desirable to remove the upper surface 74 of the object 14 by grinding means which may include a grinding wheel 80 to grind the distance L so that the ground upper surface 82 is now flush with the upper surface 68 of the body 12. In this manner the article 10 is formed with the inlaid object 14 following the exact contour of the recess to assure a perfect match in each instance and with the top surfaces 68 and 82 of the body 12 and object 14, respectively, flush with each other. If desired the inlaid object may extend above or below the upper surface of the body or extend at some angle with respect thereto.

Figure 8:
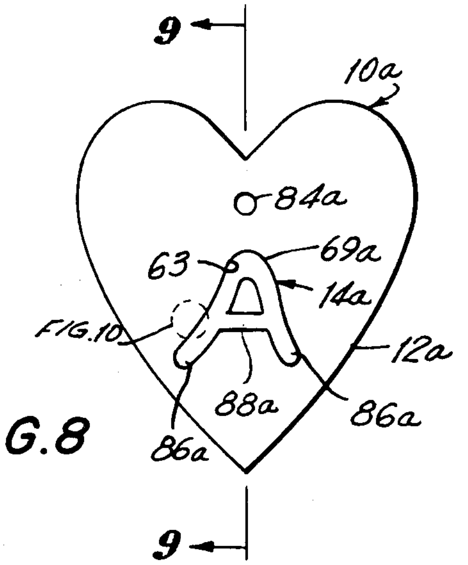
FIG. 8 is a view of another inlaid article in accordance with the present invention.
Figure 9:
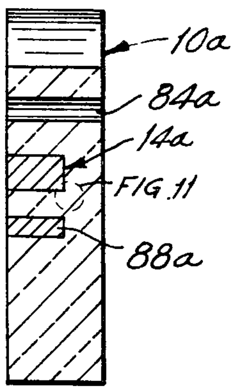
FIG. 9 is a sectional view taken along line 9—9 of FIG. 8.
Figure 10:
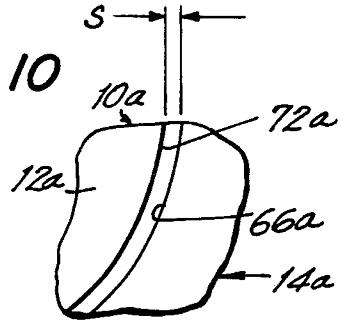
FIG. 10 is an enlarged fragmentary view illustrating the contoured relationship between the object and recess.
Figure 11:
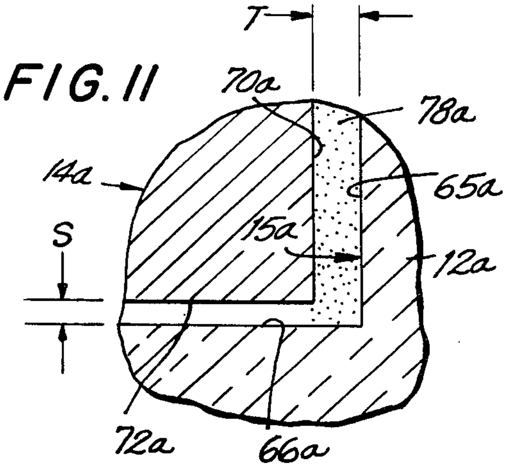
FIG. 11 is an enlarged fragmentary view illustrating the object bonded to the article.

FIGS. 8–11 illustrate another embodiment of the present invention in which the article 10*a* has inlaid therein an object 14*a* which is illustrated in the form of the letter "A" with the body portion 12*a* shown in the shape of a heart with an aperture 84*a* extending therethrough to receive a chain such that the article 10*a* may be worn as a jewelry pendant. In similar fashion the outer border 69*a* of the object 14*a* is in exact conformity with the contour 63*a* of the recess 15*a*. The object 14*a* is mounted by the adhesive 78*a* of a specific thickness T to retain the lower end 70*a* of the object 14*a* in spaced relation to the bottom 65*a* of the recess 15*a*. The side wall 72*a* of the object 14*a* is in spaced relation to the side wall 66*a* of the body 12*a* and separated by the dimension S. As seen in FIG. 8, the individual legs 86*a*, as well as the connecting portion 88*a*, are all carved simultaneously as part of the recess 15*a*.

Figure 12:
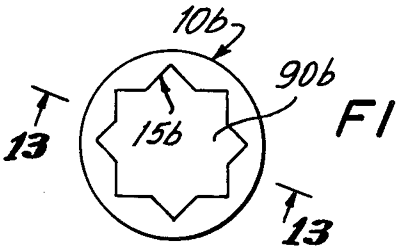
FIG. 12 is a top view of another inlaid article in accordance with the present invention.
Figure 13:
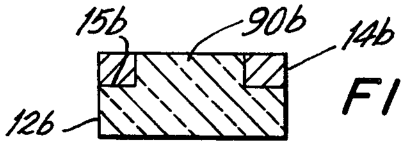
FIG. 13 is a sectional view taken along line 13—13 of FIG. 12.

FIGS. 12 and 13 illustrate another embodiment of the invention 10*b* to indicate that the object 14*a* may extend peripherally around a central core or portion 90*b* of the body 12*a*. In this manner the object 14*a* is secured and mounted as previously discussed except that in effect it is inlaid relative to a portion of the body 12*b* such that the recess 15*b* that is formed extends to the outer border of the body 12*b*.

A variety of cements have also been found to secure the object to the vibratory member during machining, in which case brazing or soldering is not required.

CONCLUSION

Accordingly, applicant has invented and disclosed herein a new and novel method and aparatus that may be used commerically to obtain inlaid articles of various sizes and shapes. Although artistic designs have been illustrated, it is appreciated that a variety of uses and applications may be utilized that are within the scope of the invention.

Many other changes could be effected in the particular constructions, and in the methods of use and construction, and in specific details thereof, hereinbefore set forth, without substantially departing from the invention intended to be defined herein, the specific description being merely of preferred embodiments capable of illustrating certain principles of the invention.

Accordingly, although illustrative embodiments of the invention have been described in detail herein with reference to the accompanying drawings, it is to be understood that the invention is not limited to those precise embodiments, and that various changes and modifications in addition to those mentioned above may be effected therein by one skilled in the art without departing from the scope or spirit of the invention, except as defined in the appended claims.

I claim:

1. The method of forming an inlaid product, comprising the steps of:

A. carving an object having a peripheral border into an article with ultrasonic energy to form a recess having the same peripheral configuration as said border, wherein said step of carving said recess further includes the steps of:
   1. coupling said object to a member adapted to be ultrasonically vibrated,
   2. bringing said object adjacent the article,
   3. supplying an abrasive slurry between the object and the article to cause abrading machining of the article by said object,
   4. simultaneously vibrating said member when said object is urged into contact with the article, and
   5. advancing the object and the article relative to each other as the abrasive progressively removes material from the article at the area of contact, whereby said recess having the same peripheral configuration as said border is formed in the article, B. positioning said object within the ultrasonically carved recess in the article, and C. securing said object within said recess, whereby said object forms the inlaid portion of the product.

2. The method as defined in claim 1, wherein said step of securing said object within said recess includes the steps of:

a. applying a bonding agent to said object, and b. curing said bonding agent so as to firmly retain said object within said recess.

3. The method as defined in claim 1, wherein the border of said object and the contour of said recess are in matching conforming relationship to each other.

4. The method as defined in claim 3, wherein the spacing between the border of said object and said contour of said recess is in the range of 0.0001 inch to 0.005 inch.

5. The method as defined in claim 4, wherein said spacing is in the range of 0.0005 inch to 0.002 inch.

6. The method as defined in claim 1, wherein said object has a substantially vertically extending peripheral border, and said recess is formed having an inner surface of a matching configuration.

7. The method as defined in claim 1, and further including the step of removing any portion of said object extending above the surface of the article until said object is flush with the surface of the article.

8. The method as defined in claim 1, and further including the step of selecting said object of a material capable of transmitting ultrasonic energy.

9. The method as defined in claim 1, wherein said object is of a metallic material.

10. The method as defined in claim 9, wherein said metallic material is gold.

11. The method as defined in claim 9, wherein said metallic material is silver.

12. The method as defined in claim 1, wherein said object is soldered to said member.

13. The method as defined in claim 1, and further including the step of selecting said article of a material capable of ultrasonic machining.

14. The method as defined in claim 13, wherein said material is stone.

15. The method as defined in claim 13, wherein said material is glass.

16. The method as defined in claim 13, wherein said material is a semi-precious jewel.

17. The method of forming an inlaid product, comprising the steps of:

A. providing an object having a peripheral border to be inlaid into an article,

B. coupling said object to a member adapted to be ultrasonically vibrated,

C. positioning said object adjacent the article,

D. supplying an abrasive slurry between said object and the article to cause abrading machining of the article by said object, E. simultaneously vibrating said member when said object is urged into contact with the article, F. advancing said object and said article relative to each other as the abrasive progressively removes material from the article at the area of the contact to form a recess, said recess having the same peripheral contour as that of said object advancing relative to the article, G. removing said object from within said recess, H. detaching said object from said member, I. positioning said object within said recess, and J. securing said object within said recess, whereby said object forms the inlaid portion of the product.

18. The method as defined in claim 17, wherein said step of securing said object within said recess includes the steps of:

a. applying a bonding agent to said object, and b. curing said bonding agent so as to firmly retain said object within said recess.

19. The method as defined in claim 17, and further including the step of forming a spacing between the border of said object and said peripheral contour of said recess, said spacing being in the range of 0.0001 inch to 0.005 inch.

20. The method as defined in claim 19, wherein said spacing is in the range of 0.0005 inch to 0.002 inch.

21. The method as defined in claim 17, and further including the step of selecting said object as capable of transmitting ultrasonic energy.

22. The method as defined in claim 17, wherein said object is of a metallic material.

23. The method as defined in claim 22, wherein said metallic material is gold.

24. The method as defined in claim 22, wherein said metallic material is silver.

25. The method as defined in claim 17, wherein said coupling of said object to said member is by soldering.

26. The method as defined in claim 17, and further including the step of selecting said article of a material capable of ultrasonic machining.

27. The method as defined in claim 26, wherein said material is stone.

28. The method as defined in claim 26, wherein said material is glass.

29. The method as defined in claim 26, wherein said material is a semi-precious jewel.

30. The method as defined in claim 17, and further including the step of removing any portion of said object extending above the surface of the article until said object is flush with the surface of the article.

31. The method as defined in claim 17, wherein said object has a substantially vertically extending peripheral border.

32. The method as defined in claim 31, wherein said recess has a substantially vertically extending wall configuration.

33. The method as defined in claim 17, wherein said coupling of said object to said member is by brazing.

34. Apparatus forming an inlaid product, comprising:

A. an object having a preipheral border and capable of transmitting ultrasonic energy, B. means for coupling said object to a member adapted to be ultrasonically vibrated, C. means for positioning said object adjacent an article, D. means for supplying an abrasive slurry between said object and the article to cause abrading machining of the article by said object, E. means for simultaneously vibrating said member when said object is urged into contact with the article, F. means for advancing said object and said article relative to each other as the abrasive progressively removes material from the article at the area of contact to form a recess having the same peripheral contour of said border formed in the article, G. means for removing said object from within the recess, H. means for detaching said object from said member, and I. means for securing said object within said recess, such that said object forms the inlaid portion of the product.

35. Apparatus as defined in claim 34, and further including means for removing any portion of said object extending above the surface of the article until said object is flush with the surface of the article.

36. Apparatus as defined in claim 34, wherein a spacing between the border of said object and said contour of said recess is obtained when said recess is formed, said spacing being in the range of 0.0001 inch to 0.005 inch.

37. Apparatus as defined in claim 36, wherein spacing is in the range of 0.0005 inch to 0.002 inch.

38. Apparatus as defined in claim 34, wherein said means for detaching said object is by soldering.

* * * * *